(12) United States Patent
Han et al.

(10) Patent No.: US 12,741,374 B2
(45) Date of Patent: Sep. 22, 2026

(54) ROBOT DIAGNOSIS APPARATUS AND METHOD THEREOF

(71) Applicants: Hyundai Motor Company, Seoul (KR); Kia Corporation, Seoul (KR)

(72) Inventors: Jae Young Han, Hwaseong-si (KR); Jae Woo Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 91 days.

(21) Appl. No.: 18/925,470

(22) Filed: Oct. 24, 2024

(65) Prior Publication Data

US 2026/0001222 A1 Jan. 1, 2026

(30) Foreign Application Priority Data

Jun. 26, 2024 (KR) ........................ 10-2024-0083870

(51) Int. Cl.
*B25J 9/16* (2006.01)
*B25J 19/00* (2006.01)

(52) U.S. Cl.
CPC ............. *B25J 9/1661* (2013.01); *B25J 9/161* (2013.01); *B25J 9/1674* (2013.01); *B25J 19/0095* (2013.01); *G05B 2219/39412* (2013.01)

(58) Field of Classification Search
CPC ........ B25J 9/161; B25J 9/1661; B25J 9/1674; B25J 19/0095; G05B 2219/39412
See application file for complete search history.

(56) References Cited

U.S. PATENT DOCUMENTS

| | | | | |
|---|---|---|---|---|
| 10,335,962 | B1 * | 7/2019 | Rosenberg | B25J 9/1674 |
| 11,351,680 | B1 * | 6/2022 | Rosenberg | B25J 19/0095 |
| 12,117,817 | B2 | 10/2024 | Isozumi et al. | |
| 2008/0247549 | A1 * | 10/2008 | Blanc | B25J 9/1674 380/277 |
| 2014/0074286 | A1 * | 3/2014 | Geheb | B25J 9/1674 700/245 |
| 2018/0250834 | A1 * | 9/2018 | Choo | B25J 9/16 |
| 2021/0011792 | A1 * | 1/2021 | Baba | G05B 19/4155 |
| 2021/0026335 | A1 | 1/2021 | Isozumi et al. | |
| 2021/0053223 | A1 * | 2/2021 | Mohri | G05B 19/4155 |
| 2022/0269273 | A1 | 8/2022 | Choi et al. | |

FOREIGN PATENT DOCUMENTS

| | | | |
|---|---|---|---|
| JP | 2001306416 | A | 11/2001 |
| JP | 2006300872 | A | 11/2006 |
| JP | 2019185258 | A | 10/2019 |
| JP | 2020034510 | A | 3/2020 |
| JP | 2022128579 | A | 9/2022 |
| KR | 20030048598 | A | 6/2003 |
| KR | 20100080332 | A | 7/2010 |
| KR | 101096376 | B1 | 12/2011 |
| KR | 20130030583 | A | 3/2013 |
| KR | 102463999 | B1 | 11/2022 |

* cited by examiner

*Primary Examiner* — Dale Moyer
(74) *Attorney, Agent, or Firm* — Slater Matsil, LLP

(57) ABSTRACT

A robot diagnosis apparatus can include a memory storing computer-executable instructions and at least one processor that accesses the memory and executes the instructions. The at least one processor can identify a target task including monitoring of a robot and a test on the robot, based on receiving a database stored in the server, identify an option group including a first option about a type of the robot and a second option about a connection between the robot and the processor, and perform a diagnosis of the robot, based on the target task and the option group.

20 Claims, 17 Drawing Sheets

Test Name : PwrBoard Monitoring

Robot Type : DAL-e

CAN / EtherCAT

| COMMUNICATION FORMAT | ID | Signal name | Rx/Tx | data | PERIOD | |
|---|---|---|---|---|---|---|
| COMMUNICATION FORMAT | 0x11 | PwrState | Rx | 1 | 200 | |
| | | PwrDrive44V | Rx | 1 | 200 | |
| | | PwrArmEn | Rx | 1 | 200 | |
| | 0x12 | HwEmgSig1 | Rx | 0 | 40 | |
| | | Count_low | Rx | 0xa1 | 40 | |
| | | Count_high | Rx | 0x00 | 40 | |
| | 0x14 | CtrlMainSwc | Tx | 1 | 200 | Send |
| | | CtrlVisionSwc | Tx | 1 | 200 | |
| EtherCAT | 0x6000 | BMS Volt | Rx | 44 | 10 | |
| | | Current | Rx | 5 | 10 | |
| | 0x7000 | BMS SOC | Rx | 89 | 10 | |
| | | Mode | Rx | 1 | 10 | |
| | | | | | | |
| | | | | | | |

FIG. 15

ROBOT DIAGNOSIS APPARATUS AND METHOD THEREOF

CROSS-REFERENCE TO RELATED APPLICATIONS

This application claims the benefit of priority to Korean Patent Application No. 10-2024-0083870, filed in the Korean Intellectual Property Office on Jun. 26, 2024, the entire contents of which are incorporated herein by reference.

TECHNICAL FIELD

The present disclosure relates to a robot diagnosis apparatus and a method thereof.

BACKGROUND

There is no diagnostic applied to a robot, such as on-board diagnostics (OBD) of a vehicle. Particularly, there is a need for a device or a system for reflecting various communication formats and database structures for each manufacturer or each robot to diagnose a robot.

To address such a problem, there is a need to develop a technology for diagnosing a robot based on various communication formats and database structures for each type of the robot.

SUMMARY

The present disclosure relates to a robot diagnosis apparatus and a method thereof, and more particularly, relates to technologies for diagnosing a robot based on various communication formats and database (DB) structures for each type of the robot.

An embodiment of the present disclosure can solve the above-mentioned problems occurring in the prior art while advantages achieved by the prior art can be maintained intact.

An embodiment of the present disclosure can provide a robot diagnosis apparatus for identifying a target task from a database stored in a server and performing a diagnosis of a robot based on the target task and an option group to check a normal communication state of the robot for each module and whether the robot normally operates, before the entire assembly of the robot, and a method thereof.

An embodiment of the present disclosure can provide a robot diagnosis apparatus for providing a user with information or requesting an input from the user, through an interface implemented based on instructions stored in a memory to increase the efficiency of a robot diagnosis operation of a user in the process of developing the robot and a method thereof.

Technical problems to be solved by an embodiment of the present disclosure are not necessarily limited to the aforementioned problems, and other technical problems not mentioned herein can be solved with an embodiment of the present disclosure, as can be understood from the following description by those skilled in the art to which the present disclosure pertains.

According to an embodiment of the present disclosure, a robot diagnosis apparatus may include a memory storing computer-executable instructions, a communication device that assists in communicating with a server, and at least one processor that accesses the memory and executes the instructions. The at least one processor may identify a target task including monitoring of a robot and a test on the robot, based on receiving a database stored in the server, may identify an option group including a first option about a type of the robot and a second option about a connection between the robot and the processor, and may perform a diagnosis of the robot, based on the target task and the option group.

In an embodiment, the at least one processor may receive the database, through Ethernet communication from the server, and may identify the target task from the database.

In an embodiment, the at least one processor may identify the option group paired with the target task, based on identifying the target task.

In an embodiment, the at least one processor may receive a format for generating the target task from a user, based on not identifying the target task, may store the target task in the database, based on generating the target task by use of the format, and may transmit the database to the server through the Ethernet communication.

In an embodiment, the at least one processor may provide the user with an interface implemented based on the instructions stored in the memory and may receive the format through the interface.

In an embodiment, the at least one processor may receive the first option and the second option from the user through the interface and may identify common information associated with communication, detailed information about a data packet for each communication format, and set, selected, or predetermined information about the monitoring, based on the second option.

In an embodiment, the at least one processor may transmit the result of diagnosing the robot through the interface, when the diagnosis of the robot is performed based on the target task and the option group.

In an embodiment, the at least one processor may provide port information about a connection with the robot, based on the target task and the option group.

In an embodiment, the at least one processor may perform a diagnosis of data included in a communication format about the connection between the robot and the processor depending on the first option and the second option, based on that the target task is the monitoring of the robot.

In an embodiment, the at least one processor may obtain a result about a movement operation of the robot, depending on the first option and the second option, based on the target task being the test on the robot.

According to an embodiment of the present disclosure, a robot diagnosis method may include identifying a target task including monitoring of a robot and a test on the robot, based on receiving a database stored in a server, identifying an option group including a first option about a type of the robot and a second option about a connection between the robot and a processor included in an apparatus for diagnosing the robot, and performing a diagnosis of the robot, based on the target task and the option group.

In an embodiment, the identifying of the target task may include receiving the database, through Ethernet communication from the server, and identifying the target task from the database.

In an embodiment, the identifying of the target task may further include identifying the option group paired with the target task, based on identifying the target task.

In an embodiment, the identifying of the target task may further include receiving a format for generating the target task from a user, based on not identifying the target task, storing the target task in the database, based on generating the target task by use of the format, and transmitting the database to the server through the Ethernet communication.

In an embodiment, the receiving of the format may include providing the user with an interface implemented based on instructions stored in the apparatus for diagnosing the robot and receiving the format through the interface.

In an embodiment, the receiving of the format may include receiving the first option and the second option from the user through the interface and identifying common information associated with communication, detailed information about a data packet for each communication format, and predetermined information about the monitoring, based on the second option.

In an embodiment, the performing of the diagnosis of the robot may include transmitting the result of diagnosing the robot through the interface, when the diagnosis of the robot is performed based on the target task and the option group.

In an embodiment, the performing of the diagnosis of the robot may include providing port information about a connection with the robot, based on the target task and the option group.

In an embodiment, the performing of the diagnosis of the robot may include performing a diagnosis of data included in a communication format about the connection between the robot and the processor depending on the first option and the second option, based on that the target task is the monitoring of the robot.

In an embodiment, the performing of the diagnosis of the robot may include obtaining a result about a movement operation of the robot, depending on the first option and the second option, based on the target task being the test on the robot, and providing a user with the obtained result.

BRIEF DESCRIPTION OF THE DRAWINGS

The above and other features and advantages of the present disclosure can be more apparent from the following detailed description taken in conjunction with the accompanying drawings, in which:

FIG. 15 is a drawing illustrating an example of an interface for outputting a result of diagnosing a robot, according to an embodiment of the present disclosure;

Figure 1:
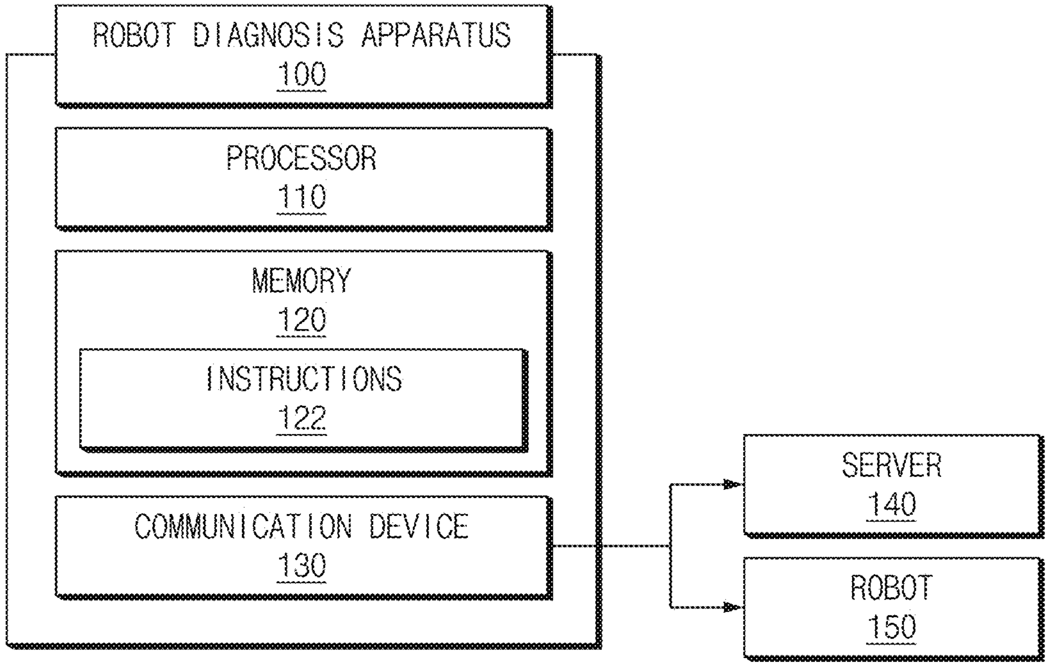
FIG. 1 is a drawing illustrating a block diagram of a robot diagnosis apparatus according to an embodiment of the present disclosure.

With regard to description of drawings, same or similar denotations may be used for same or similar components.

DETAILED DESCRIPTION OF ILLUSTRATIVE EMBODIMENTS

Hereinafter, some example embodiments of the present disclosure will be described in detail with reference to the drawings. In adding the reference numerals to the components of each drawing, identical components can be designated by the identical numerals even when they are displayed on other drawings. In addition, a detailed description of well-known features or functions can be ruled out to not unnecessarily obscure the gist of the present disclosure. Hereinafter, various embodiments of the present disclosure may be described with reference to the accompanying drawings. However, it can be understood that the example embodiments are not necessarily intended to limit the present disclosure to specific implementation forms and includes various modifications, equivalents, and/or alternatives of embodiments of the present disclosure.

In describing components of example embodiments of the present disclosure, the terms "first," "second," "A," "B," "(a)," "(b)," and the like, may be used herein. These terms can be used merely to distinguish one component from another component, but do not necessarily limit the corresponding components irrespective of the order or priority of the corresponding components. Furthermore, unless otherwise defined, terms including technical and scientific terms used herein can have a same meaning as being generally understood by those skilled in the art to which the present disclosure pertains. Such terms as those defined in a generally used dictionary can be interpreted as having meanings equal to the contextual meanings in the relevant field of art. For example, the terms, such as "first", "second", "1st", "2nd", or the like, can be used in the present disclosure to refer to various components regardless of the order and/or the priority and to distinguish one component from another component, and do not necessarily limit the components. For example, a first user device and a second user device can indicate different user devices, irrespective of the order and/or priority. For example, without departing the scope of the present disclosure, a first component may be referred to as a second component, and similarly, a second component may be referred to as a first component.

In the present disclosure, the expressions "have", "may have", "include" and "comprise", or "may include" and "may comprise" indicate existence of corresponding features (e.g., components such as numeric values, functions, operations, or parts), but do not exclude presence of additional features.

It can be understood that when a component (e.g., a component) is referred to as being "(operatively or communicatively) coupled with/to" or "connected to" another component (e.g., a second component), it can be directly coupled with/to or connected to the other component or an intervening component (e.g., a third component) may be present. In contrast, when a component (e.g., a first component) is referred to as being "directly coupled with/to" or "directly connected to" another component (e.g., a second component), it can be understood that there is no intervening component (e.g., a third component).

According to the situation, the expression "configured to" used in the present disclosure may be used exchangeably with, for example, the expression "suitable for", "having the capacity to", "designed to", "adapted to", "made to", or "capable of".

The term "configured to" must not necessarily mean only "specifically designed to" in hardware. Instead, the expression "a device configured to" may mean that the device is "capable of" operating together with another device or other parts. For example, a "processor configured to perform A, B, and C" can be a generic-purpose processor (e.g., a central processing unit (CPU) or an application processor) that may perform corresponding operations by executing one or more software programs for a dedicated processor (e.g., an embedded processor) for performing a corresponding operation or stored on a memory device. Terms used in the disclosure can be used to describe specified example embodiments and are not intended to necessarily limit the scopes of other embodiments. The terms of a singular form may include plural forms unless the context clearly indicates otherwise. In some cases, even though terms can be specific terms used in the specification for describing an example embodiment, such terms should not be interpreted to necessarily exclude other embodiments of the present disclosure.

In the present disclosure, the expressions "A or B", "at least one of A or/and B", or "one or more of A or/and B", and the like, may include any and all combinations of the associated listed items. For example, the term "A or B", "at least one of A and B", or "at least one of A or B" may refer to all of case (1) where at least one A is included, case (2) where at least one B is included, or case (3) where both of at least one A and at least one B are included. Furthermore, in describing an embodiment of the present disclosure, each of such phrases as "A or B", "at least one of A and B", "at least one of A or B", "A, B, or C", "at least one of A, B, and C", "at least one of A, B, or C", and "at least one of A, B, or C, or any combination thereof" may include any one of, or all possible combinations of the items enumerated together in a corresponding one of the phrases. Particularly, the phrase such as "at least one of A, B, or C, or any combination thereof" may include "A", "B", or "C", or "AB" or "ABC", which is a combination thereof.

Hereinafter, example embodiments of the present disclosure will be described in detail with reference to FIGS. 1 to 17.

FIG. 1 is a drawing illustrating a block diagram of a robot diagnosis apparatus according to an embodiment of the present disclosure.

A robot diagnosis apparatus 100 according to an embodiment may include a processor 110, a memory 120 including instructions 122, and a communication device 130, any combination of or all of which may be in plural or may include plural components thereof.

The robot diagnosis apparatus 100 may indicate an apparatus for diagnosing a robot. For example, the robot diagnosis apparatus 100 may provide a user with pieces of information included in a database (DB) stored in a server 140 to diagnose a robot 150, based on the DB. The robot diagnosis apparatus 100 may request the user to input pieces of information to be included in the DB to diagnose the robot 150. The robot diagnosis apparatus 100 may provide the user with the result obtained by performing a diagnosis of the robot 150, based on the input pieces of information. The robot diagnosis apparatus 100 may manage the DB stored in the server 140 through Ethernet communication and may be directly connected with the robot 150 through a communication input/output terminal to perform a monitoring diagnosis and an operation test.

The processor 110 may execute software and may control at least one other component (e.g., a hardware and/or software component) connected with the processor 110. The processor 110 may perform a variety of data processing or calculation. For example, the processor 110 may store the DB in the memory 120.

For reference, the processor 110 may perform all operations performed by the robot diagnosis apparatus 100. Therefore, for convenience of description in the specification, the operation performed by the robot diagnosis apparatus 100 is mainly described as an operation performed by the processor 110. Furthermore, for convenience of description in the specification, the processor 110 is mainly described as, but not limited to, one processor. For example, the robot diagnosis apparatus 100 may include at least one processor. Each of the at least one processor (together, separated, or integrated) can perform all operations associated with a robot diagnosis operation.

The memory 120 can be a storage medium that can temporarily and/or permanently store various pieces of data and/or information used to perform the robot diagnosis operation. For example, the memory 120 may store the DB.

The communication device 130 may assist in performing communication between the robot diagnosis apparatus 100 and the server 140. For example, the communication device 130 may include one or more components for performing communication between the robot diagnosis apparatus 100 and the server 140. For example, the communication device 130 may include a short range wireless communication unit, a microphone, or the like. At this time, a short range communication technology may be, but is not limited to, a wireless LAN (Wi-Fi), Bluetooth, ZigBee, Wi-Fi Direct (WFD), ultra-wideband (UWB), infrared data association (IrDA), Bluetooth low energy (BLE), near field communication (NFC), or the like, for example.

Figure 2:
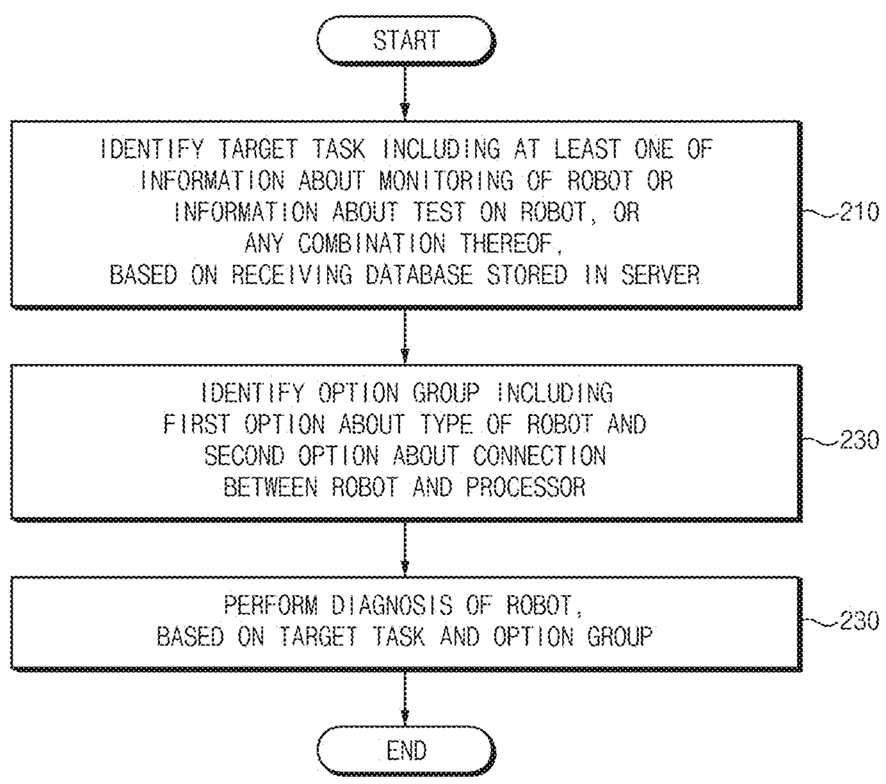
FIG. 2 is a flowchart for describing a robot diagnosis method according to an embodiment of the present disclosure.

FIG. 2 is a flowchart for describing a robot diagnosis method according to an embodiment of the present disclosure.

In operation 210, a processor (e.g., a processor 110 of FIG. 1) according to an embodiment may identify a target task including monitoring of a robot (e.g., a robot 150 of FIG. 1) and a test on the robot, based on receiving a database (DB) stored in a server (e.g., a server 140 of FIG. 1).

The target task may include pieces of information for a diagnosis of the robot or a test on the robot or instructions for performing the diagnosis of the robot or the test on the robot. In detail, for convenience of description in the specification, the diagnosis of the robot and the monitoring of the robot may be described as a same operation. The test on the robot may include, but is not limited to, a test on an operation associated with motion of the robot, a test on a communication state between the robot and the server and a robot diagnosis apparatus (e.g., a robot diagnosis apparatus 100 of FIG. 1), a test on hardware or software of the robot, or the like. For example, the test on the robot may include a BMS test and a motor test, and the diagnosis of the robot may include communication monitoring and a failure diagnosis.

The processor may identify at least one of a name of a diagnosis or test applied to the robot, a type of the diagnosis or test, or a rule of the diagnosis or test, or any combination thereof. In other words, the processor may perform a diagnosis of the robot by use of the target task, may perform an operation test on the robot, may perform a test on a communication state of the robot, or may perform a diagnosis about hardware of the robot. In other words, the target task may include information about whether the processor should perform any operation for the robot.

Illustratively, the processor may perform a diagnosis of data included in a communication format about a connection between the robot and the processor depending on a first option and a second option, based on that the target task is monitoring of the robot. In contrast, the processor may obtain a result about a movement operation of the robot, depending on the first option and the second option, based on that the target task is a test on the robot, and may provide a user with the obtained result. A description of providing the result will be given below with reference to FIG. 15.

In operation 230, the processor may identify an option group including the first option about a type of the robot and the second option about a connection between the robot and the processor. For example, the first option may indicate information about the type of the robot. The second option may include information about the communication format, in the connection between the robot and the processor. The processor may identify an option group to perform the diagnosis of the robot and the test on the robot. The processor may perform the target task (e.g., the diagnosis of the robot and the test on the robot) described in operation 230, based on the pieces of information included in the option group.

In an operation, the processor may perform the diagnosis of the robot, based on the target task and the option group. For example, the processor may identify a diagnosis and a test to be performed for the robot by use of the target task. After identifying the diagnosis and the test, the processor may identify the pieces of information included in the option group. The processor may determine the type of the robot based on the first option and may determine a connection format between the robot and the processor. When the type of the robot and the connection format are determined, the processor may perform the diagnosis of the robot, based on the motoring of the robot and the test on the robot, which can be included in the target task.

Figure 3:
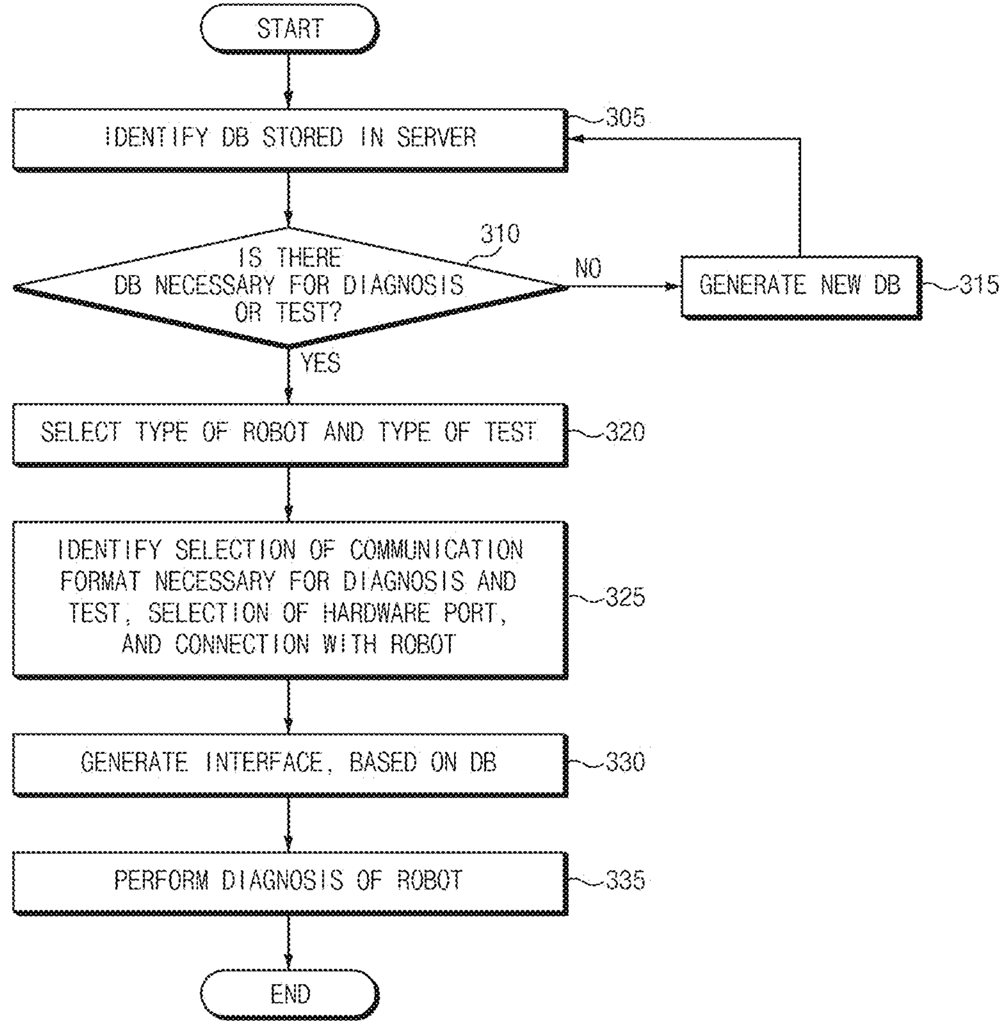
FIG. 3 is a flowchart for describing an operation of performing a robot diagnosis, in a robot diagnosis apparatus according to an embodiment of the present disclosure.

FIG. 3 is a flowchart for describing an operation of performing a robot diagnosis, in a robot diagnosis apparatus according to an embodiment of the present disclosure.

In operation 305, a processor (e.g., a processor 110 of FIG. 1) according to an embodiment may identify a database (DB) stored in a server (e.g., a server 140 of FIG. 1) through Ethernet communication. For example, the processor may provide a user with the identified DB, through an interface of a program including a code or instructions for performing the operation of FIG. 2. Illustratively, the user may check information of the DB, which can be provided to the interface through a liquid crystal display (LCD) monitor.

In operation 310, the processor may check whether there is a DB necessary for a diagnosis or a test. For example, the processor may identify a target task including monitoring of the robot and a test on the robot, based on receiving the DB, to check whether there is the DB necessary for the diagnosis of the robot and the test on the robot.

In operation 315, the processor may generate a new DB, based on that the DB necessary for the diagnosis and the test is not identified. When generating the DB, the processor may store the DB in the server. A detailed description of operation 315 will be given below with reference to FIG. 4.

In operation 320, the processor may select and/or identify a type of the robot and a type of the test. For example, the processor may provide the user with an interface implemented based on instructions stored in a memory. The user may input a first option and a second option, through the provided interface. The user may additionally input a type of the robot and a type of the test, through the provided interface. A detailed description of operation 320 will be given below with reference to FIG. 12. The pieces of information input by the user may be applied to an operation of generating the DB identified by the processor.

In operation 325, the processor may identify a selection of a communication format necessary for a diagnosis and a test, a selection of a hardware port, and a connection with the robot. In detail, the processor may identify an option group (i.e., the first option and the second option) paired with the target task, based on identifying the target task. For example, when the user inputs the second option, the processor may identify the selection of the communication format. The user may select the hardware port for a connection between the robot and the processor.

When the second option is input by the user, the processor may identify common information associated with communication, detailed information about a data packet for each communication format, and set, selected, or predetermined information about the monitoring, based on the second option. The pieces of pieces of information input and selected by the user may be applied to the operation of generating the DB identified by the processor. A detailed description of operation 325 will be given below with reference to FIG. 13.

In operation 330, the processor may generate an interface, based on the DB generated by the pieces of information input and selected by the user. For example, the processor may output the interface generated based on the generated DB, through the LCD monitor.

In operation 335, the processor may perform a diagnosis of the robot. For example, when the user clicks on (or inputs) the diagnosis of the robot through a touch function of the LCD monitor, the processor may perform the diagnosis of the robot. When the diagnosis of the robot is performed based on the target task and the option group, the processor may transmit the result of diagnosing the robot through the interface.

Figure 4:
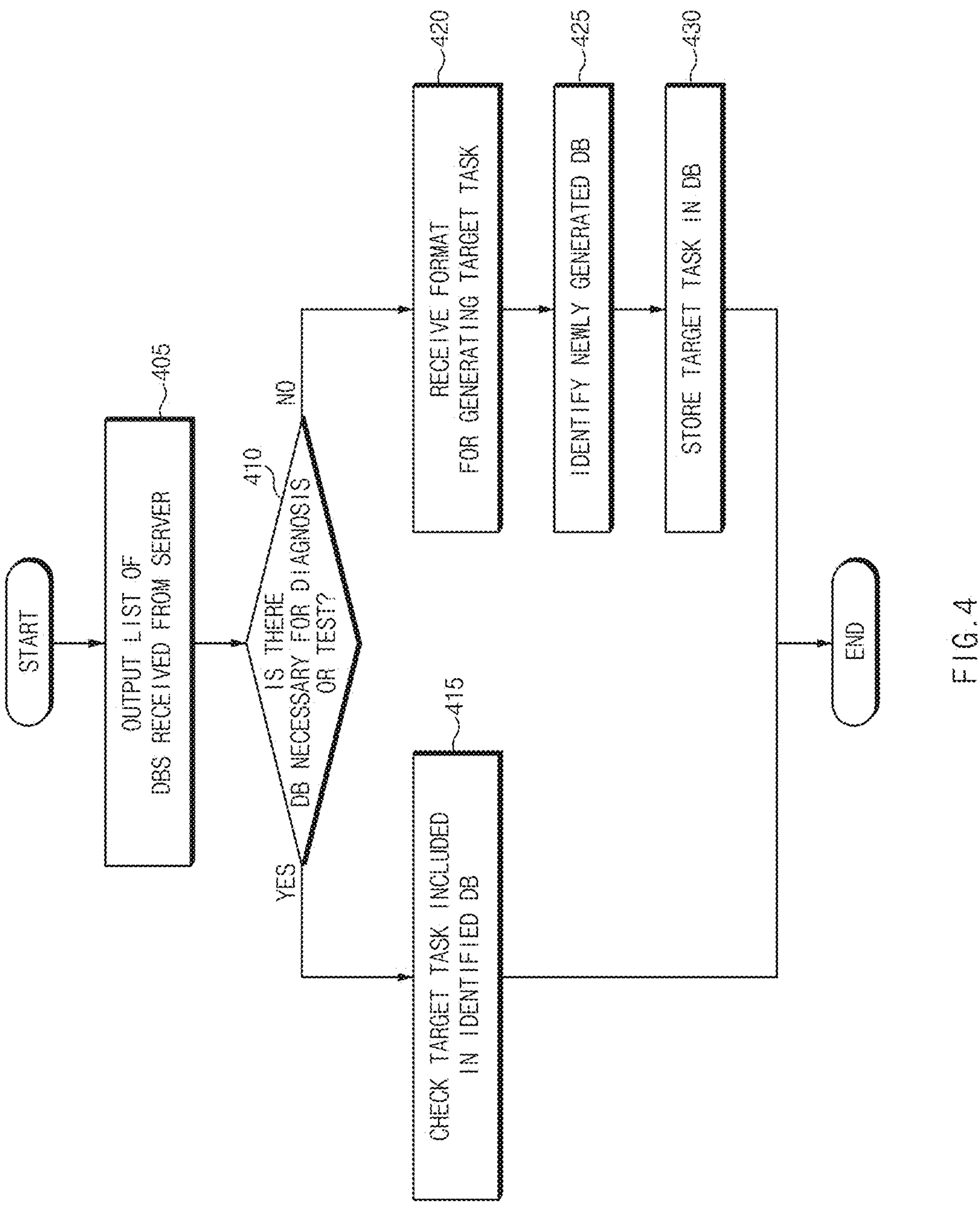
FIG. 4 is a flowchart for describing a method for receiving a DB from a server, in a robot diagnosis apparatus according to an embodiment of the present disclosure.

FIG. 4 is a flowchart for describing a method for receiving a DB from a server, in a robot diagnosis apparatus according to an embodiment of the present disclosure.

In operation 405, a processor (e.g., a processor 110 of FIG. 1) according to an embodiment may output a list of DBs received from the server. For example, the processor may receive at least one DB from the server. Each of the at least one DB may store a target task for a robot.

In operation 410, the processor may check whether there is a DB necessary for a diagnosis or a test. For example, the processor may identify a target task including monitoring of the robot and a test on the robot, based on receiving the DB, to check whether there is the DB necessary for the diagnosis of the robot and the test on the robot. Illustratively, when the target task is a first diagnosis (e.g., a communication state diagnosis), the processor may check whether there is a DB about the first diagnosis among the at least one DB.

When identifying the DB about the first diagnosis (e.g., contents included in the target task), in operation 415, the processor may check the target task included in the identified DB. In other words, a user may select a desired DB among the at least one DB. The processor may determine whether the target task is included in the DB selected by the user. When the target task is included in the DB selected by the user, the processor may perform operation 320 described in FIG. 3.

In operation 420, the processor may receive a format for generating the target task from the user, based on not identifying the target task. Herein, the format may indicate a format of the DB. The processor may receive the format from the user through the interface.

In operation 425, the processor may identify a newly generated DB. For example, in operation 430, the processor may store the target task in the DB, based on generating the target task by use of the format. The processor may transmit the DB to a server through Ethernet communication, for example.

Figure 5:
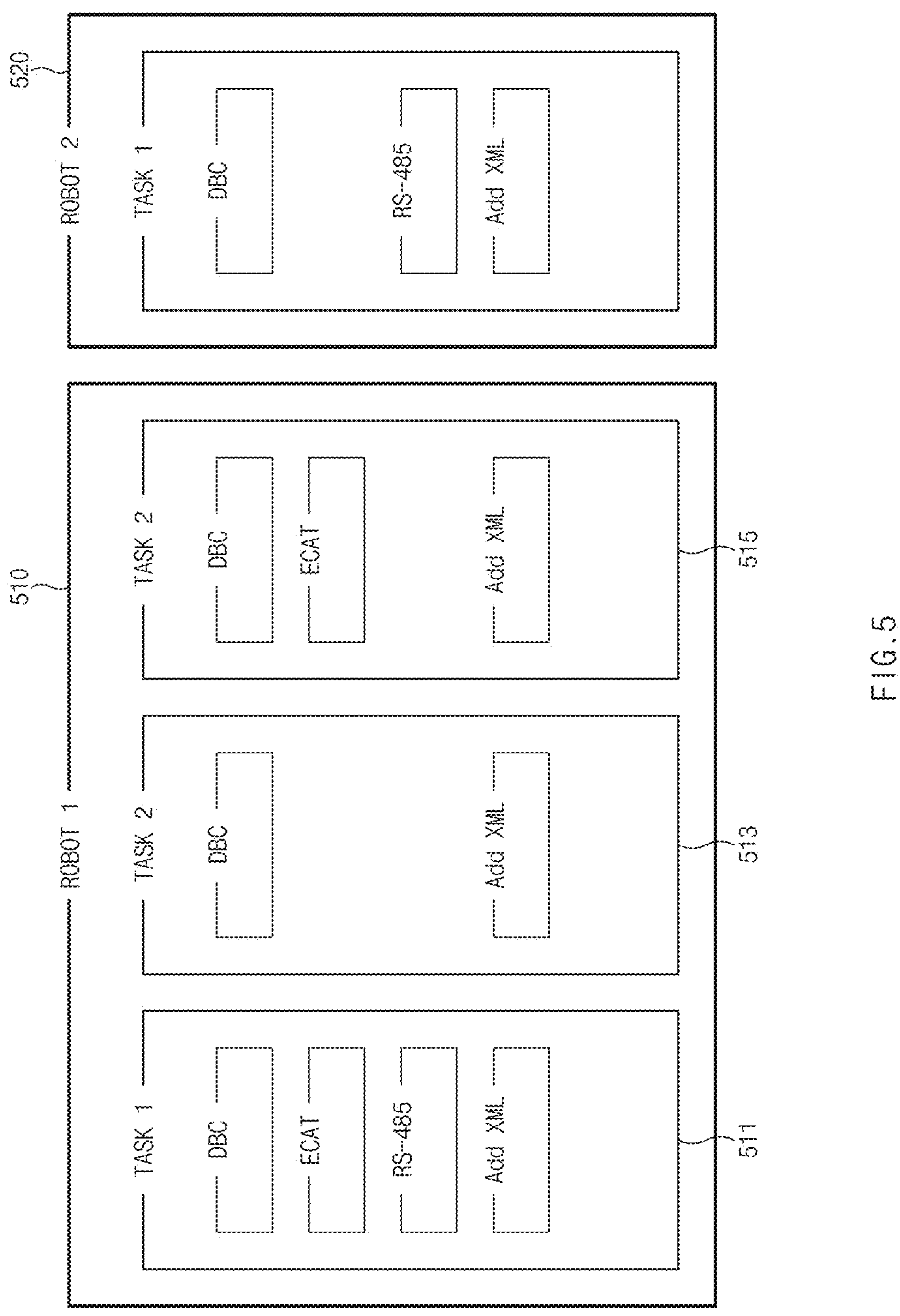
FIG. 5 is a drawing illustrating an example of a DB including a target task according to an embodiment of the present disclosure.

FIG. 5 is a drawing illustrating an example of a DB including a target task of an embodiment of the present disclosure.

Referring to FIG. 5, a structure of a DB directory stored in a server (e.g., a server 140 of FIG. 1) is illustrated. For example, the directory structure may include a large category, a medium category, and a small category. The large category may be a category about a type of a robot. The medium category may be a category about a diagnosis or a test (i.e., a target task). The small category may be a category about a DB for each communication format to be used in the target task. Illustratively, the DB may include information about a first robot 510 and information about a second robot 520, based on the large category. The DB may include a first target task 511, a second target task 513, and a third target task 515 of the first robot 510, based on the medium category.

There can be various robots due to the nature of the robot. A communication format for each robot may not perform various tasks using one database. For example, a communication speed protocol or the like may vary although the same communication scheme is used. Therefore, the DB may be classified for each developed robot and may include a test, a diagnosis, or the like for each robot as each task.

For the target task, several data communications may be required and one data communication may be used. In this case, because the structure of the database can differ for each communication scheme, the processor may use a database controller area network (CAN) (DBC), for CAN communication in which there is a standard DB. In contrast, when there is no the standard DB, the processor may use an XML-based DB. Because it can be possible to check only data about a number in a universal monitoring program, the processor may additionally store data for a diagnosis in the DB and may store required information for each target task by use of an add extensible markup language (XML) (e.g., an additional DB), when it can be unable to store the data in the standard DB (e.g., the DBC in CAN communication).

Figure 6:
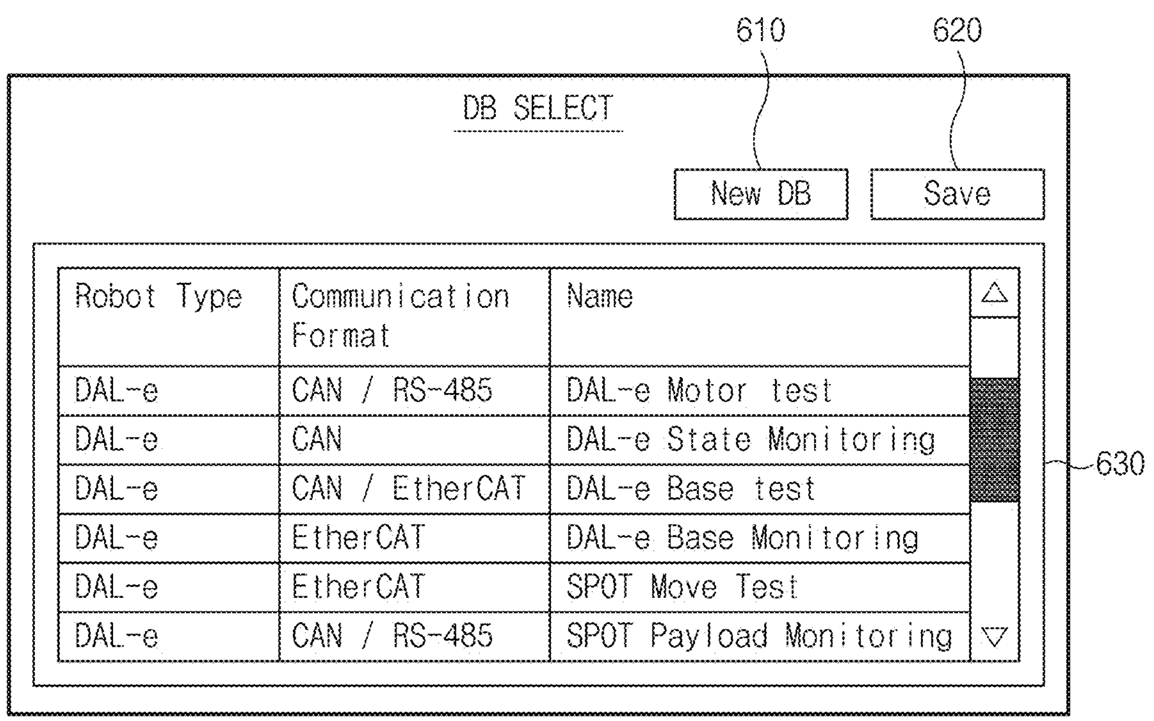
FIG. 6 is a drawing illustrating an example of an interface about selection of a DB when a program including a code or instructions for performing an operation of diagnosing a robot is executed, according to an embodiment of the present disclosure.

FIG. 6 is a drawing illustrating an example of an interface about selection of a DB when a program including a code or instructions for performing an operation of diagnosing a robot is executed.

FIG. 6 illustrates an interface about a selection of a DB when a program including a code or instructions for performing the operation of FIG. 2 is executed. For example, a processor (e.g., a processor 110 of FIG. 1) may provide a DB list 630 received from a server (e.g., a server 140 of FIG. 1). A user may check the DB list 630, through an interface. The user may click on a new DB generation button 610, when there is no required DB. The user may click on a selection button and/or save button 620, when there is a required DB available in the DB list 630.

FIGS. 7 to 11 are drawings illustrating an example of an interface about generation of a DB.

Figure 7:
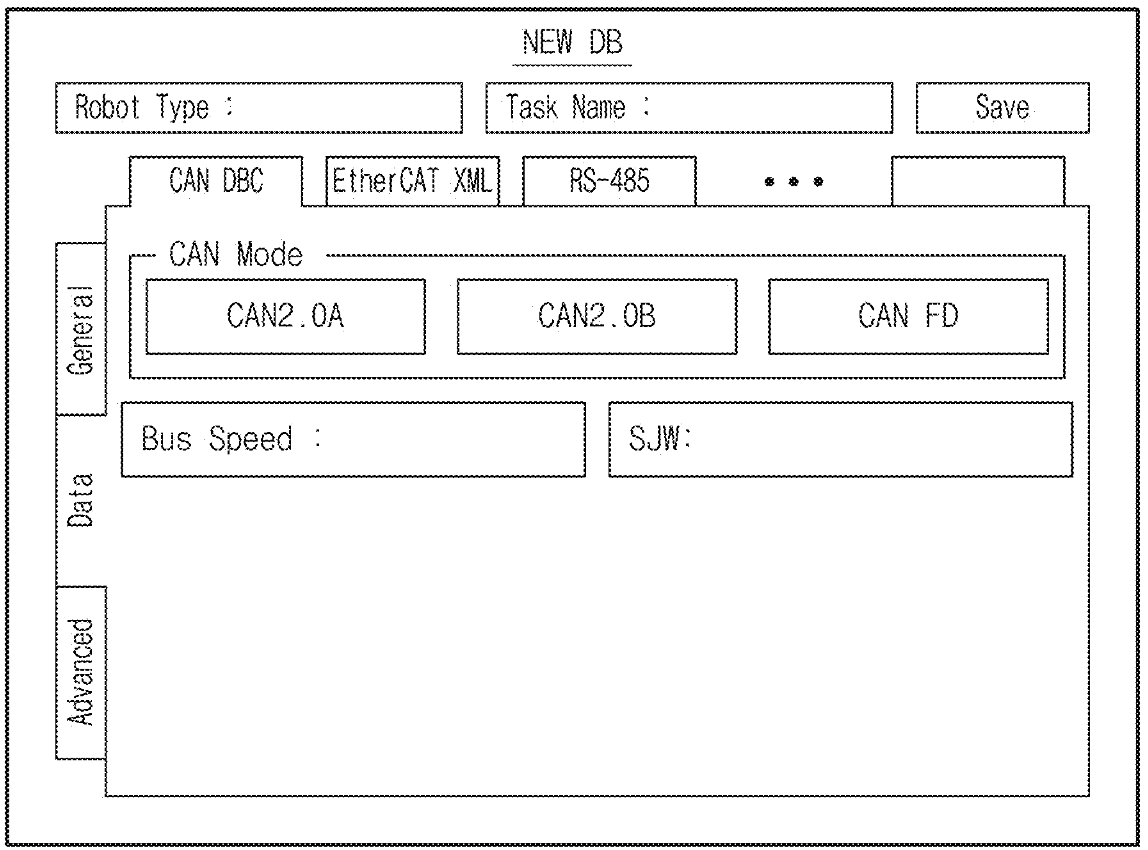
FIGS. 7, 8, 9, 10, and 11 are drawings illustrating an example of an interface about generation of a DB, according to an embodiment of the present disclosure.

Referring to FIG. 7, a processor (e.g., a processor 110 of FIG. 1) according to an embodiment may provide an interface for newly generating a DB. Herein, when a robot type and a communication format are selected through the interface, the processor may provide a data label corresponding to the communication format. Illustratively, a self-DB format of a CAN DBC may be used for CAN communication and a DB format of an EtherCAT XML may be used for EtherCAT communication. In contrast, it is described that there can be no determined DB format in RS 485/422/232 communication and the RS 485/422/232 uses an XML format for convenience of description in the present disclosure.

The processor may provide common information (e.g., a general tap) associated with communication, detailed information (e.g., a data tap) about a data packet for each communication format, and predetermined information (e.g., an advanced tap) about monitoring, through an interface to generate a DB. A user may fill a data value to suit each DB format. Thereafter, when the user pushes the save button, a DB may be generated. The generated DB may be stored in a server (e.g., through Ethernet communication).

Figure 8:
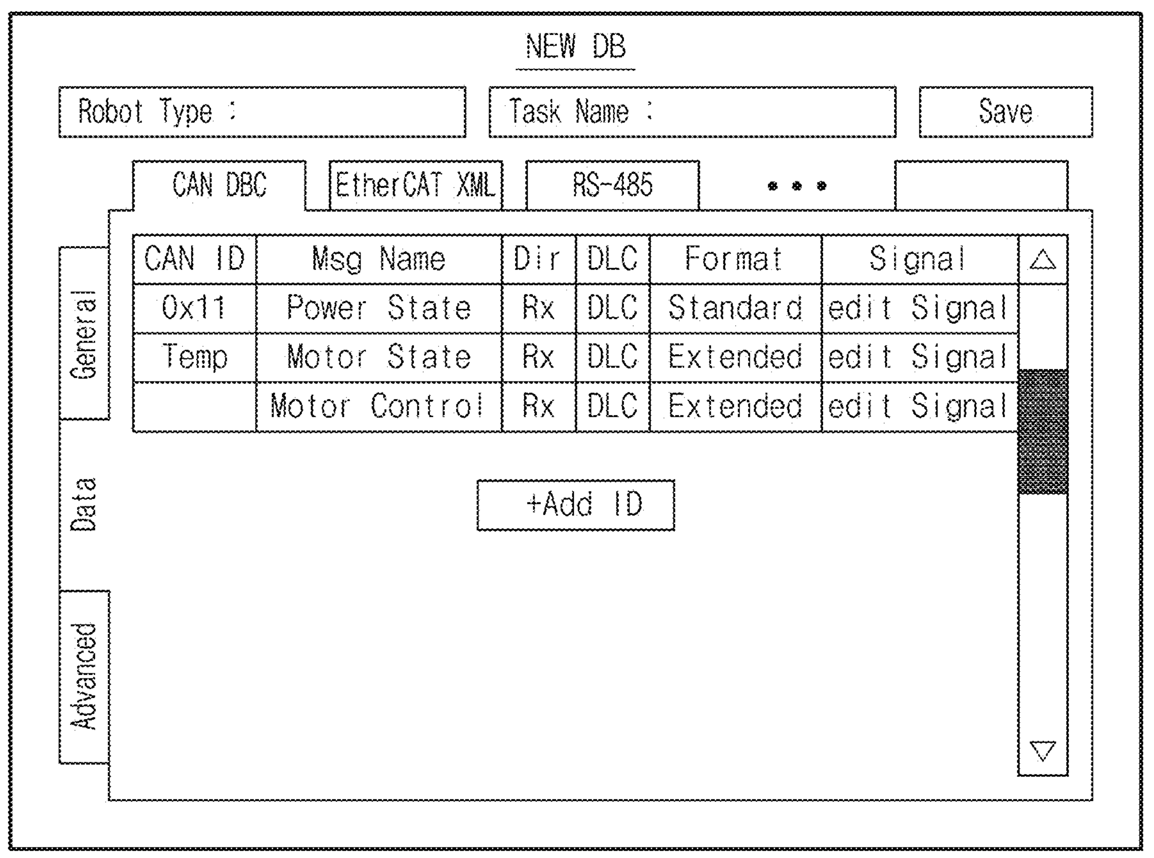

Referring to FIG. 8, the processor may provide an interface capable of adding a message for each communication format. For example, the message for each communication format may include a communication ID, a name, transmission or reception, a data size, a format, or the like. The user may edit detailed data for each ID (e.g., each CAN ID), by use of an edit signal.

Figure 9:
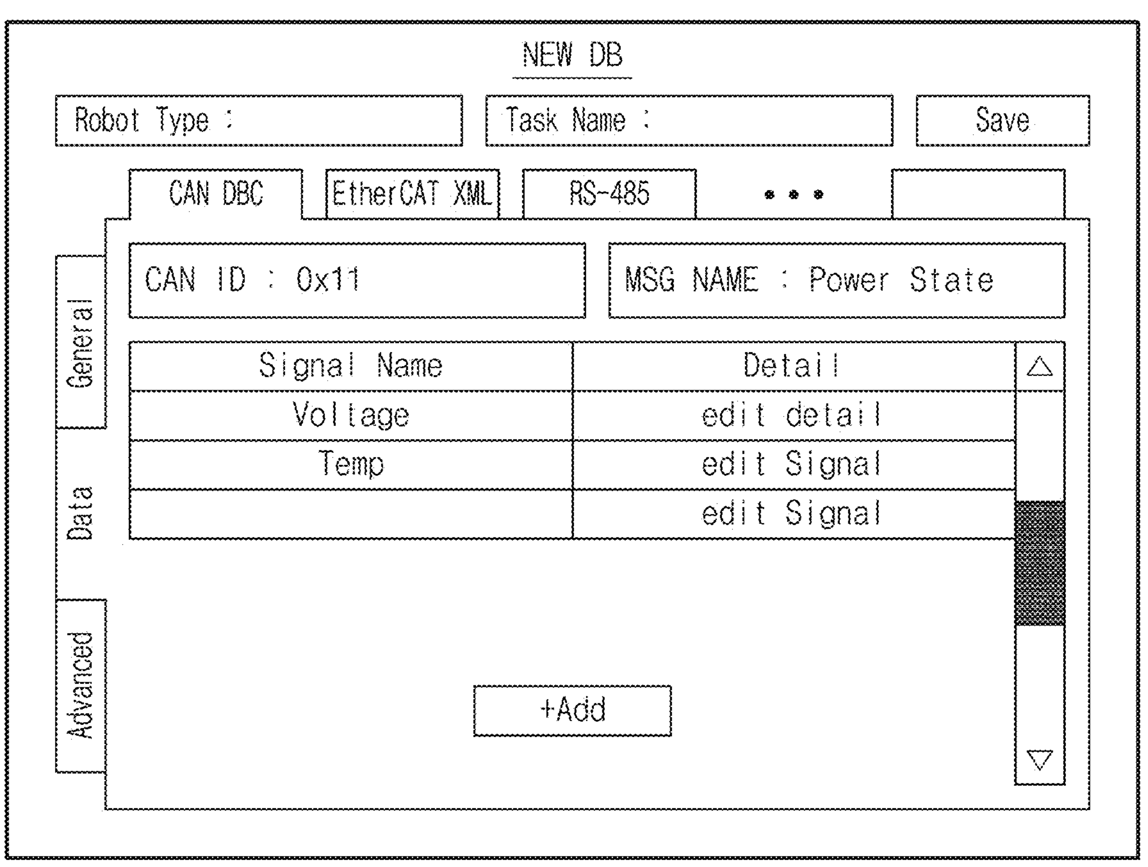

Referring to FIG. 9, illustratively, when a second option is CAN communication, the processor may provide an interface capable of editing detailed data of the CAN communication. For example, the user may add signal data included in each ID for CAN communication and may edit a detail by use of an edit detail.

Figure 10:
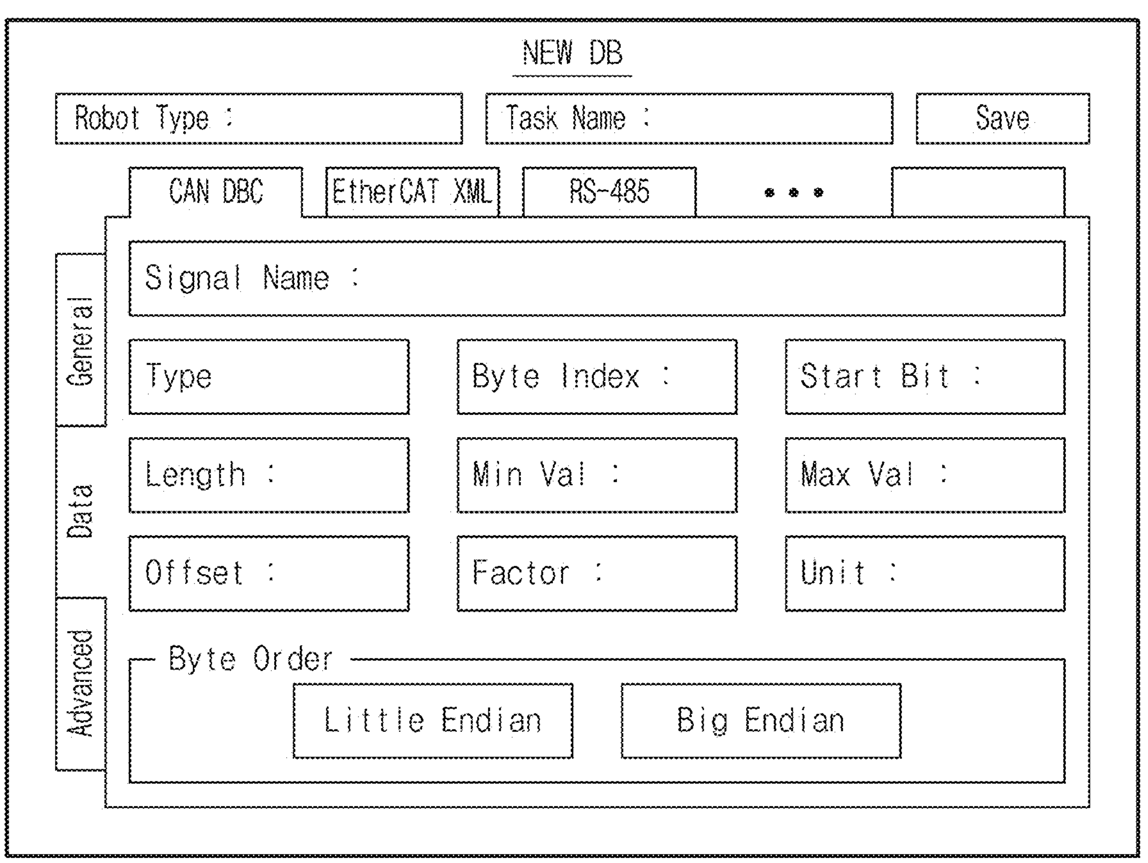

Referring to FIG. 10, the processor may provide an interface capable of editing a data setting according to a communication format. For example, the user may set a data type, a size, an initial value range, or the like suitable for the communication format, for a CAN communication format.

Figure 11:
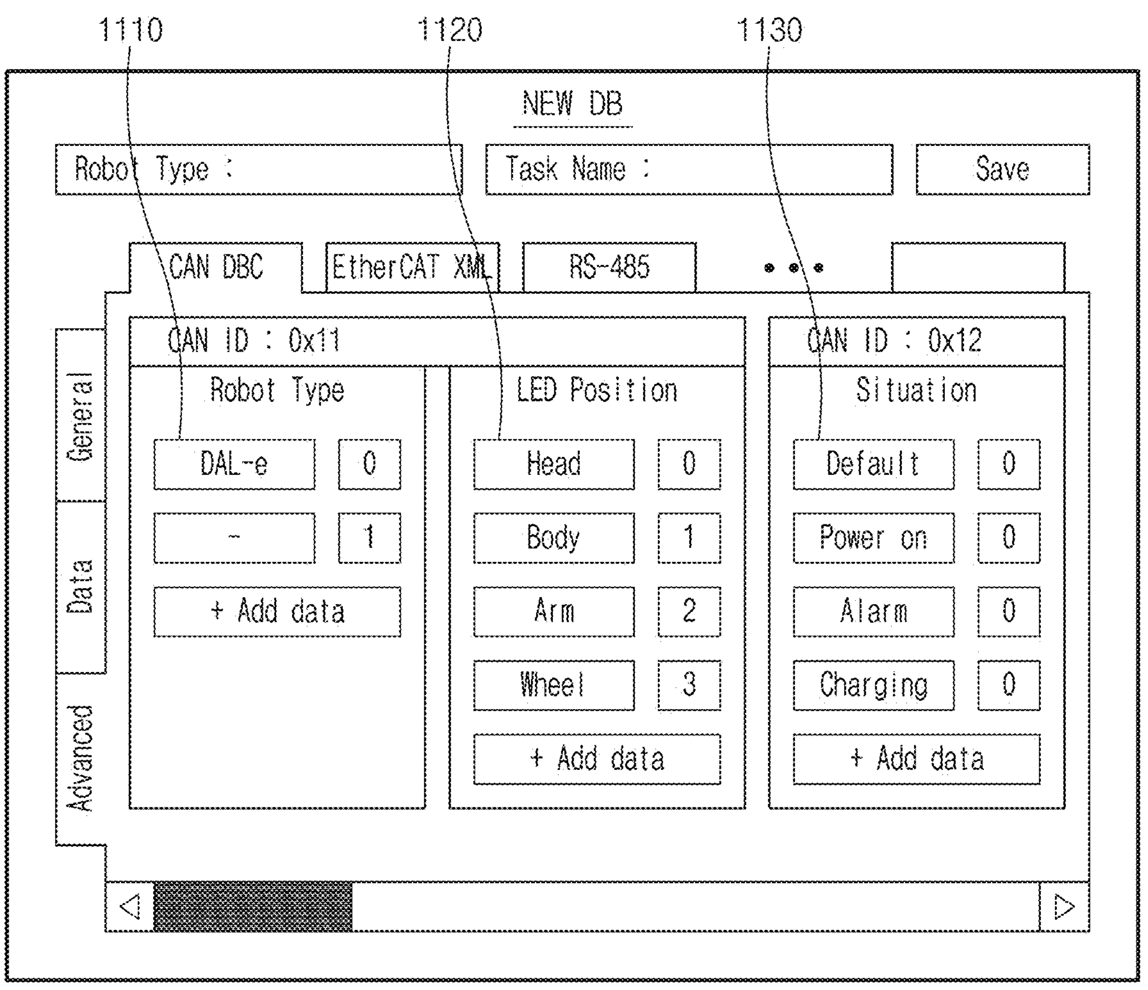

Referring to FIG. 11, the processor may provide predetermined information about monitoring, through an interface. For example, the predetermined information about the monitoring may be represented with the advanced tap, on the interface. The predetermined information may be generated by the number of IDs and detailed signals, which can be generated on the data tap. When the user inputs the predetermined information, the processor may match data of each signal from a number to a character.

For example, when the user inputs "Robot type-Hotel Delivery" in a first setting 1110, inputs "LED position-Wheel" in a second setting 1120, and inputs "Situation-Alarm" in a third setting 1130, the processor may provide an interface in the form of "Robot type-Hotel Delivery, LED position-Wheel, Situation-Alarm", rather than providing an interface in the form of "(0,2), (1,3), (2,2)".

Figure 12:
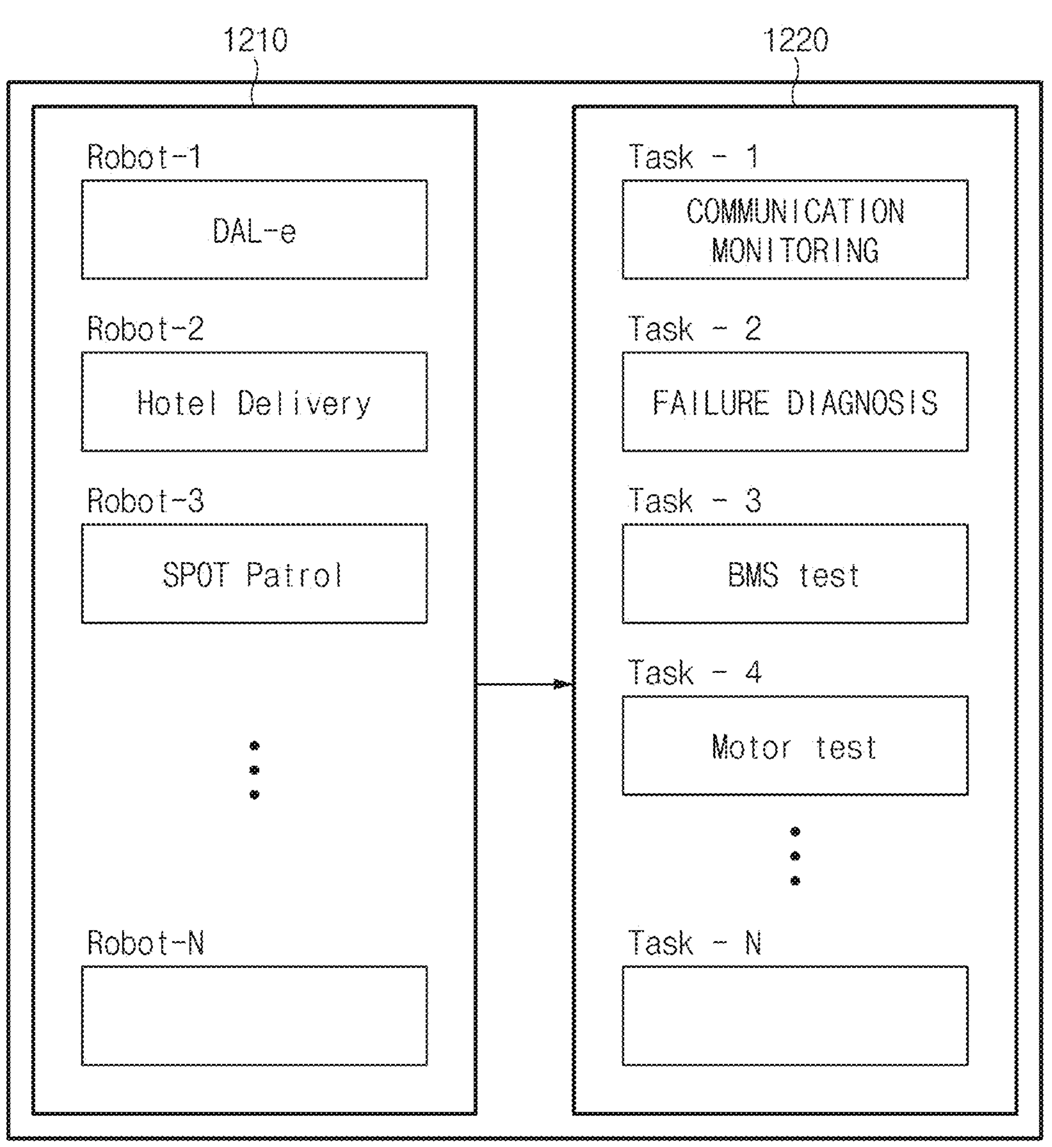
FIG. 12 is a drawing illustrating an example of a relationship between a target task and an option group, which can be identified by a robot diagnosis apparatus according to an embodiment of the present disclosure.

FIG. 12 is a drawing illustrating an example of a relationship between a target task and an option group, which can be identified by a robot diagnosis apparatus according to an embodiment of the present disclosure.

Referring to FIG. 12, a processor may provide selections of a robot type and a test type, through an interface. A user may select a robot based on a database structure, depending on a required DB in operation 310 of FIG. 3 and may select a target task for the robot. The processor may provide a first selection menu 1210 to receive the type of the robot from the user. The processor may provide a second selection menu 1220 to receive the target task from the user.

Figure 13:
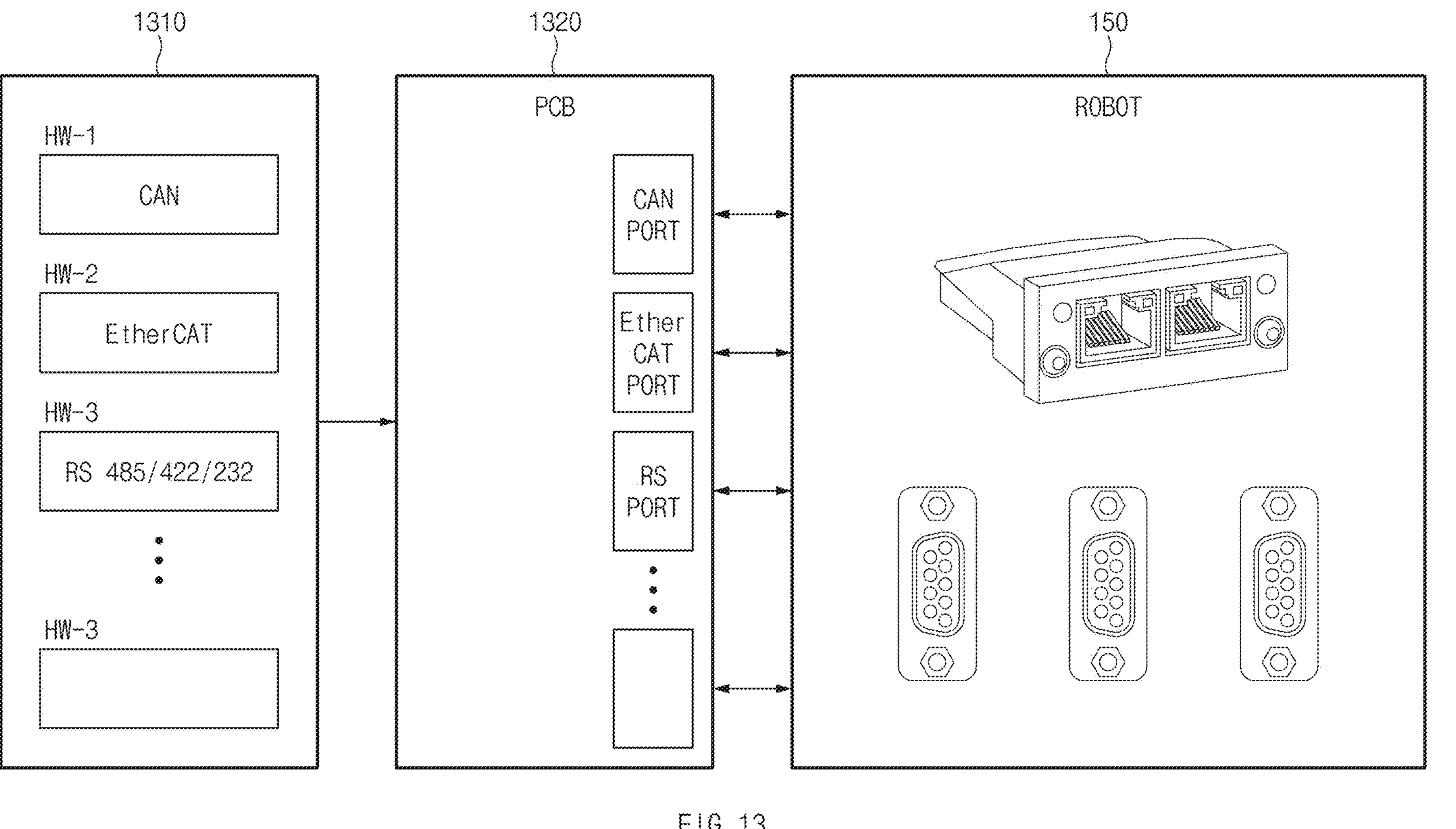
FIG. 13 is a drawing illustrating an example of providing port information about a connection with a robot, in a robot diagnosis apparatus according to an embodiment of the present disclosure.

FIG. 13 is a drawing illustrating an example of providing port information about a connection with a robot, in a robot diagnosis apparatus according to an embodiment of the present disclosure.

A processor (e.g., a processor 110 of FIG. 1) according to an embodiment may provide port information about a connection with a robot 150, based on a target task and an option group. For example, a user may select a communication format 1310 suitable for a diagnosis and a test. The user may select a hardware port 1320 suitable for the diagnosis of the robot 150 and the test on the robot 150, depending on the selected communication format.

Referring to the robot 150 shown in FIG. 13, the robot 150 may store information about the hardware port 1320 for each communication. Illustratively, for CAN communication, the hardware port 1320 may be DSUB 9-pin and may include a JST 4-pin connector. For EtherCAT communication, the hardware port 1320 may be a LAN cable. For RS communication, the hardware port 1320 may mainly be DSUB 9-pin. However, the hardware port 1320 is not limited thereto. The hardware port 1320 may be a desired other port for each manufacturer or user.

Figure 14:
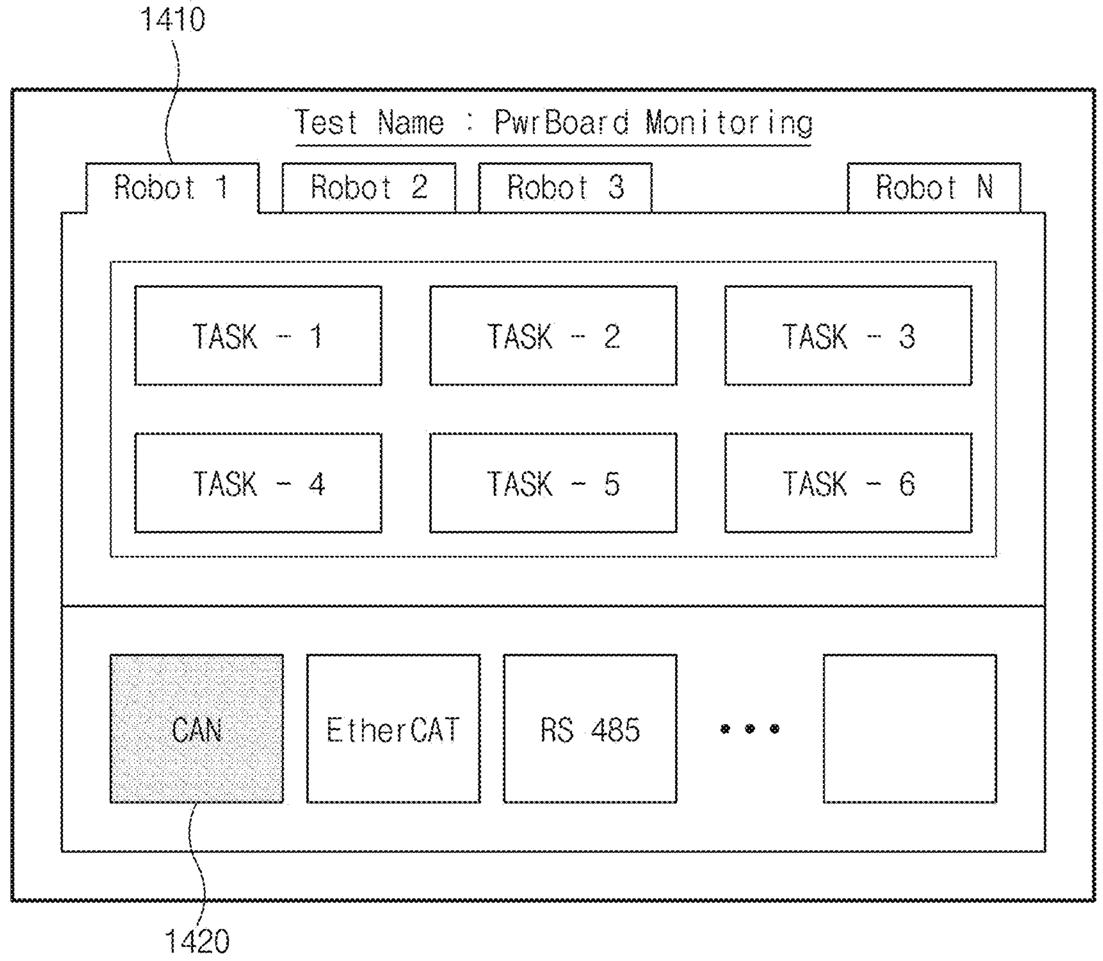
FIG. 14 is a drawing illustrating an example of an interface for requesting to input an option group, according to an embodiment of the present disclosure.

FIG. 14 is a drawing illustrating an example of an interface for requesting to input an option group.

A processor (e.g., a processor 110 of FIG. 1) according to an embodiment may receive a format for generating a target task from a user, based on not identifying the target task. The processor may store the target task in a DB, based on generating the target task by use of the format. The processor may provide the user with the interface shown in FIG. 14 to receive the format.

The processor may provide a robot selection menu 1410 and a communication format menu 1420 corresponding to the selected robot, through the interface. For example, when the user selects "Robot 1" through the robot selection menu 1410, the processor may provide target tasks associated with "Robot 1". When the user selects "TASK-1" among the target tasks associated with "Robot 1", the processor may determine "TASK-1" as the target task. The processor may provide the communication format menu 1420 associated with the determined target task.

FIG. 15 is a drawing illustrating an example of an interface for outputting the result of diagnosing a robot.

A processor (e.g., a processor 110 of FIG. 1) according to an embodiment may perform a diagnosis of data included in a communication format about a connection between a robot and the processor depending on a first option and a second option, based on that a target task is monitoring of the robot. In contrast, the processor may obtain a result about a movement operation of the robot, depending on the first option and the second option, based on that the target task is a test on the robot, and may provide a user with the obtained result.

Referring to FIG. 15, the processor may provide the user with an interface for outputting the result of diagnosing the robot. The interface about outputting the result may include an Rx value in which a period and a data value are monitored according to a receive value, a Tx value capable of changing and transmitting data and a period to a desired value, or a data value including a specified range and form when a DB is generated.

Figure 16:
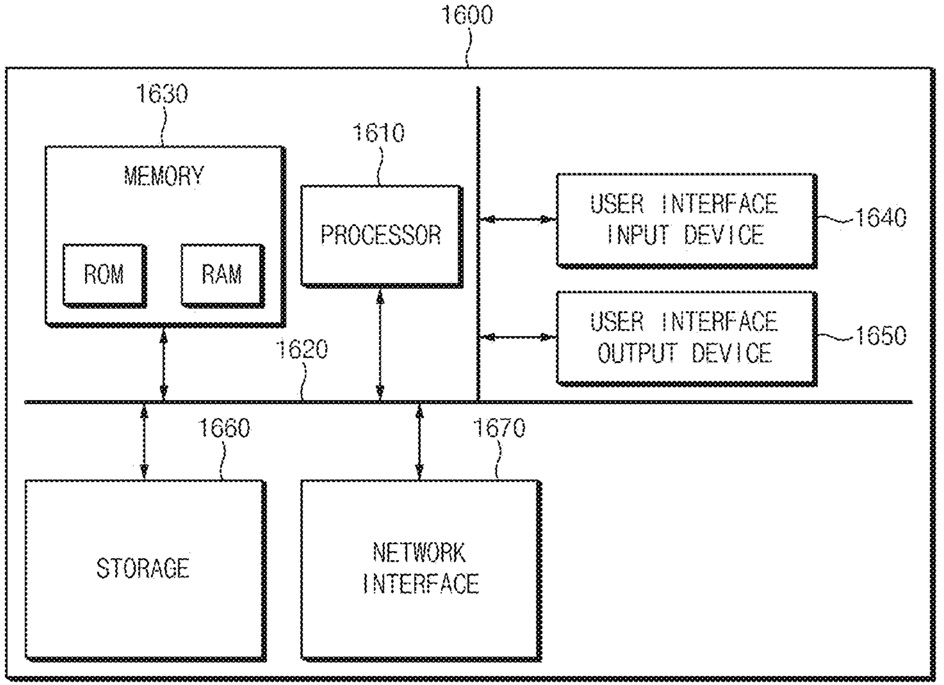
FIG. 16 is a drawing illustrating a computing system associated with a robot diagnosis apparatus or a robot diagnosis method according to an embodiment of the present disclosure.

FIG. 16 is a drawing illustrating a computing system associated with a robot diagnosis apparatus or a robot diagnosis method according to an embodiment of the present disclosure.

Referring to FIG. 16, a computing system 1600 about the robot diagnosis apparatus or the robot diagnosis method may include at least one processor 1610, a memory 1630, a user interface input device 1640, a user interface output device 1650, storage 1660, and a network interface 1670, which are connected with each other via a bus 1620, any combination of or all of which may be in plural or may include plural components thereof.

The processor 1610 may be a central processing unit (CPU) or a semiconductor device that processes instructions stored in the memory 1630 and/or the storage 1660. A storage medium can include a memory 1630 and a storage 1660, which may include various types of volatile or non-volatile storage media. For example, the memory 1630 may include a ROM (Read Only Memory) and a RAM (Random Access Memory).

Accordingly, the operations of the method or algorithm described in connection with the embodiments disclosed in the specification may be directly implemented with a hardware module, a software module, or a combination of the hardware module and the software module, which can be executed by the processor 1610. The software module may reside on a storage medium (that is, the memory 1630 and/or the storage 1660) such as a RAM, a flash memory, a ROM, an EPROM, an EEPROM, a register, a hard disc, a removable disk, and a CD-ROM.

The example storage medium may be coupled to the processor 1610. The processor 1610 may read out information from the storage medium and may write information in the storage medium. Alternatively, the storage medium may be integrated with the processor 1610. The processor and the storage medium may reside in an application specific integrated circuit (ASIC). The ASIC may reside within a user terminal. In another case, the processor and the storage medium may reside in the user terminal as separate components.

Figure 17:
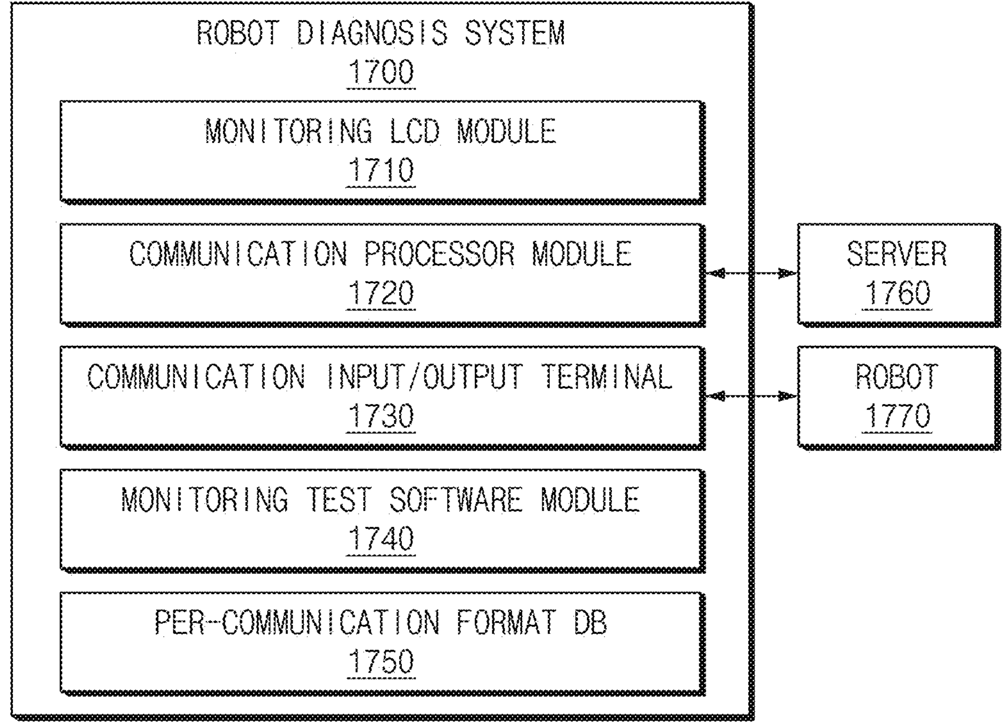
FIG. 17 is a drawing illustrating a robot diagnosis system associated with a robot diagnosis apparatus or a robot diagnosis method according to an embodiment of the present disclosure.

FIG. 17 is a drawing illustrating a robot diagnosis system associated with a robot diagnosis apparatus or a robot diagnosis method according to an embodiment of the present disclosure.

FIG. 17 illustrates a robot diagnosis system 1700 associated with a robot diagnosis apparatus (e.g., a robot diagnosis apparatus 100 of FIG. 1) or a robot diagnosis method according to an embodiment. For example, the robot diagnosis system 1700 may include a monitoring LCD module 1710, a communication processor module 1720, a communication input/output terminal 1730, a monitoring test software module 1740, and a per-communication format DB 1750, any combination of or all of which may be in plural or may include plural components thereof. The robot diagnosis system 1700 may perform communication with a server 1760, by use of the communication processor module 1720. The robot diagnosis system 1700 may be connected with a robot 1770, through the communication input/output terminal 1730. For reference, the robot diagnosis system 1700 may perform all operations performed by the robot diagnosis apparatus in a same manner. Therefore, the robot diagnosis system 1700 may also perform the operation of the robot diagnosis apparatus described with reference to FIGS. 1 to 17 in a same manner.

Hereinabove, although the present disclosure has been described with reference to example embodiments and the accompanying drawings, the present disclosure is not limited thereto, but may be variously modified and altered by those skilled in the art to which the present disclosure pertains without departing from the spirit and scopes of the present disclosure claimed in the following claims.

The above-described example embodiments may be implemented with hardware components, software components, and/or a combination of hardware components and software components. For example, the devices, methods, and components described in the example embodiments may be implemented using general-use computers or special-purpose computers, such as a processor, a controller, an arithmetic logic unit (ALU), a digital signal processor, a microcomputer, a field programmable array (FPGA), a programmable logic unit (PLU), a microprocessor, or any device which may execute instructions and respond. A processing unit may perform an operating system (OS) or a software application running on the OS. Further, the processing unit may access, store, manipulate, process and generate data in response to execution of software. It can be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively instruct the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner or distributed manner. Software and data may be recorded in one computer-readable storage media.

The methods according to an embodiment may be implemented in the form of program instructions which may be executed through various computer implementations and may be recorded in computer-readable media. The computer-readable media may include program instructions, data files, data structures, and the like alone or in combination, and the program instructions recorded on the media may be specially designed and configured for an example or may be known and usable to those skilled in the art of computer software. Examples of computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions can include both machine codes, such as produced by a compiler, and higher level codes that may be executed by the computer using an interpreter.

The above-described hardware devices may be configured to act as one or a plurality of software modules to perform the operations of the embodiments, or vice versa.

Even though example embodiments are described with reference to restricted drawings, one skilled in the art can variously change or modify an embodiment based on the above description. For example, adequate effects may be achieved even if the foregoing processes and methods are carried out in different order than described above, and/or the aforementioned components, such as systems, structures, devices, or circuits, are combined or coupled in different forms and modes than as described above or be substituted or switched with other components or equivalents.

A description will be given of some advantages of the robot diagnosis apparatus and the method thereof according to an embodiment of the present disclosure.

According to at least one embodiment of the present disclosure, the robot diagnosis apparatus may identify a target task from a database stored in a server and may perform a diagnosis of a robot based on the target task and an option group, thus checking a normal communication state of the robot for each module and whether the robot normally operates, before the entire assembly of the robot.

According to at least one embodiment of the present disclosure, the robot diagnosis apparatus may provide a user with information or may request an input from the user, through an interface implemented based on instructions stored in a memory, thus increasing the efficiency of a robot diagnosis operation of the user in the process of developing the robot.

In addition, various effects and advantages ascertained directly or indirectly through the present disclosure may be provided.

Therefore, other implements, other embodiments, and equivalents to claims can be within the scopes of the following claims.

Therefore, the example embodiments of the present disclosure are not intended to necessarily limit the technical spirit of the present disclosure, but are provided for illustrative purposes. The scopes of the present disclosure can be construed on the basis of the accompanying claims, and technical ideas within scopes equivalent to the claims can be included in the scopes of the present disclosure.

What is claimed is:

1. A robot diagnosis apparatus, comprising:
at least one processor;
a communication device configured to assist in communicating with a server; and
a storage medium storing computer-readable instructions that, when executed by the at least one processor, cause the at least one processor to:
identify a target task including monitoring of a robot and a test on the robot, based on receiving a database stored in the server, wherein the database includes, for each of a plurality of communication formats, detailed information on data packets and information related to monitoring;
identify an option group including a first option about a type of the robot and a second option about a connection between the robot and the processor;
communicate with the robot corresponding to the first option using a particular communication format of the plurality of communication formats corresponding to the second option;

receive, based on the communication with the robot, data corresponding to the target task;

interpret the received data based on the detailed information on data packets and the information related to monitoring for the particular communication format corresponding to the second option; and perform a diagnosis of the robot, based on the interpretation of the received data.

2. The apparatus of claim 1, wherein the instructions further cause the at least one processor to:

receive the database through Ethernet communication from the server; and identify the target task from the database.

3. The apparatus of claim 2, wherein the instructions that cause the at least one processor to identify the option group further cause the at least one processor to:

identify the option group paired with the target task, based on identifying the target task.

4. The apparatus of claim 2, wherein the instructions further cause the at least one processor to:

receive a format for generating the target task from a user, based on not being dependent upon identifying the target task;

store the target task in the database, based on generating the target task using the format; and transmit the database to the server through the Ethernet communication.

5. The apparatus of claim 4, wherein the instructions further cause the at least one processor to:

provide the user with an interface implemented based on the instructions stored in the storage medium; and receive the format through the interface.

6. The apparatus of claim 5, wherein the instructions further cause the at least one processor to:

receive the first option and the second option from the user through the interface; and identify common information associated with communication based on the second option.

7. The apparatus of claim 6, wherein the instructions further cause the at least one processor to transmit a result of diagnosing the robot through the interface, in response to the diagnosis of the robot being performed based on the interpretation of the received data.

8. The apparatus of claim 1, wherein the instructions further cause the at least one processor to provide port information about the connection with the robot, based on the target task and the option group.

9. The apparatus of claim 1, wherein the instructions further cause the at least one processor to:

obtain a result about a movement operation of the robot, depending on the first option and the second option, based on the target task is the test on the robot.

10. A robot diagnosis apparatus, comprising:

at least one processor;

a communication device configured to assist in communicating with a server; and a storage medium storing computer-readable instructions that, when executed by the at least one processor, cause the at least one processor to:

identify a target task including monitoring of a robot, based on receiving a database stored in the server, wherein the database includes, for each of a plurality of communication formats, detailed information on data packets and information related to monitoring:

identify an option group including a first option about a type of the robot and a second option about a connection between the robot and the processor;

communicate with the robot corresponding to the first option using a particular communication format of the plurality of communication formats corresponding to the second option;

receive, based on the communication with the robot, data corresponding to the target task;

interpret the received data based on the detailed information on data packets and the information related to monitoring for the particular communication format corresponding to the second option; and perform a diagnosis of the robot, based on the interpretation of the received data, wherein the instructions that cause the at least one processor to perform the diagnosis further cause the at least one processor to, based on that the target task is the monitoring of the robot, perform an assessment of data included in the particular communication format about the connection between the robot and the processor depending on the first option and the second option.

11. A robot diagnosis method comprising:

identifying a target task including monitoring of a robot and a test on the robot, based on receiving a database stored in a server, wherein the database includes, for each of a plurality of communication formats, detailed information on data packets and information related to monitoring;

identifying an option group including a first option about a type of the robot and a second option about a connection between the robot and a processor included in an apparatus for diagnosing the robot;

receiving data corresponding to the target task by communicating with the robot corresponding to the first option using a particular communication format of the plurality of communication formats corresponding to the second option;

interpreting the received data based on the detailed information on data packets and the information related to monitoring for the particular communication format corresponding to the second option; and performing a diagnosis of the robot, based on the interpretation of the received data.

12. The method of claim 11, wherein the identifying of the target task comprises:

receiving the database, through Ethernet communication from the server; and identifying the target task from the database.

13. The method of claim 12, wherein the identifying of the option group further comprises identifying the option group paired with the target task, based on identifying the target task.

14. The method of claim 12, wherein the identifying of the target task further comprises:

receiving a format for generating the target task from a user, based on not being dependent on identifying the target task;

storing the target task in the database, based on generating the target task by use of the format; and transmitting the database to the server through the Ethernet communication.

15. The method of claim 14, wherein the receiving of the format comprises:

providing the user with an interface implemented based on instructions stored in the apparatus for diagnosing the robot; and receiving the format through the interface.

16. The method of claim 15, wherein the receiving of the format comprises:
receiving the first option and the second option from the user through the interface; and
identifying common information associated with communication based on the second option.

17. The method of claim 16, wherein the performing of the diagnosis of the robot comprises transmitting a result of diagnosing the robot through the interface, in response to the diagnosis of the robot being performed based on the interpretation of the received data.

18. The method of claim 11, wherein the performing of the diagnosis of the robot comprises providing port information about the connection with the robot, based on the target task and the option group.

19. The method of claim 11, wherein based on that the target task is the monitoring of the robot, the performing of the diagnosis of the robot comprises performing an assessment of data included in the particular communication format about the connection between the robot and the processor depending on the first option and the second option.

20. The method of claim 11, wherein the performing of the diagnosis of the robot comprises:
obtaining a result about a movement operation of the robot, depending on the first option and the second option, based on the target task is the test on the robot; and
providing a user with the obtained result.

* * * * *